United States Patent
Volkovs et al.

(10) Patent No.: US 12,288,236 B2
(45) Date of Patent: Apr. 29, 2025

(54) RECOMMENDATION WITH NEIGHBOR-AWARE HYPERBOLIC EMBEDDING

(71) Applicant: THE TORONTO-DOMINION BANK, Toronto (CA)

(72) Inventors: Maksims Volkovs, Toronto (CA); Zhaoyue Cheng, Toronto (CA); Juan Felipe Perez Vallejo, Toronto (CA); Jianing Sun, Toronto (CA); Saba Zuberi, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 479 days.

(21) Appl. No.: 17/674,229

(22) Filed: Feb. 17, 2022

(65) Prior Publication Data

US 2022/0270155 A1     Aug. 25, 2022

Related U.S. Application Data

(60) Provisional application No. 63/150,541, filed on Feb. 17, 2021.

(51) Int. Cl.
| | | |
|---|---|---|
| *G06Q 30/00* | (2023.01) | |
| *G06N 3/047* | (2023.01) | |
| *G06N 3/08* | (2023.01) | |
| *G06Q 30/0601* | (2023.01) | |

(52) U.S. Cl.
CPC ......... *G06Q 30/0631* (2013.01); *G06N 3/047* (2023.01); *G06N 3/08* (2013.01)

(58) Field of Classification Search
CPC ....... G06Q 30/0631; G06N 3/047; G06N 3/08
See application file for complete search history.

(56) References Cited

PUBLICATIONS

Chamberlain, B.P. et al. "Scalable Hyperbolic Recommender Systems", arXiv [online], Feb. 22, 2019 [retrieved on May 31, 2024]. https://arxiv.org/abs/1902.08648 (Year: 2019).*
Chami, I et al. "Hyperbolic Graph Convolutional Neural Networks", arXiv [online], Oct. 28, 2019 [retrieved on May 31, 2024]. https://arxiv.org/abs/1910.12933 (Year: 2019).*
WIPO International Search Report with Written Opinion of the ISA mailed in Application No. PCT/CA2022/050227 dated Jun. 1, 2022, 9 pages.
Bastings, et al., "The Conference on Empirical Methods in Natural Language Processing," Proceedings of the Conference, EMNLP © 2017 The Association for Computational Linguistics, Sep. 9, 11, 2017, Copenhagen, Denmark, 74 pages; https://aclanthology.org/D17-1000.pdf.

(Continued)

*Primary Examiner* — Anand Loharikar
(74) *Attorney, Agent, or Firm* — Patent Capital Group

(57) ABSTRACT

A recommendation system generates recommendations for user-item pairs based on embeddings in hyperbolic space. Each user and item may be associated with a local hyperbolic embedding representing the user or item in hyperbolic space. The hyperbolic embedding may be modified by neighborhood information. Because the hyperbolic space may have no closed form for combining neighbor information, the local embedding may be converted to a tangent space for neighborhood aggregation information and converted back to hyperbolic space for a neighborhood-aware embedding to be used in the recommendation score.

15 Claims, 7 Drawing Sheets

(56) References Cited

PUBLICATIONS

Bonnabel, S., "Stochastic gradient descent on Riemannian manifolds," IEEE Transactions on Automatic Control 58, No. 9, Nov. 19, 2013, 29 pages; https://arxiv.org/pdf/1111.5280.pdf.

Chamberlain, et al., "Scalable hyperbolic recommender systems," arXiv preprint arXiv: 1902.08648, Feb. 22, 2019, 11 pages; https://arxiv.org/pdf/1902.08648.pdf.

Chami, et al., "Hyperbolic graph convolutional neural networks," Advances in neural information processing systems, Department of Computer Science, Stanford University, Institute for Computational and Mathematical Engineering, Stanford University 2019, 12 pages; https://proceedings.neurips.cc/paper/2019/file/0415740eaa4d9decbc8da001d3fd805f-Paper.pdf.

Chami, et al., "Low-dimensional hyperbolic knowledge graph embeddings," arXiv preprint arXiv:2005.00545v1, May 1, 2020, 14 pages; https://arxiv.org/pdf/2005.00545.pdf.

Chen, et al., "Measuring and relieving the over-smoothing problem for graph neural networks from the topological view," vol. 34 No. 04, The Thirty-Fourth AAAI Conference on Artificial Intelligence (AAAI-20), Feb. 7-12, 2020, 8 pages; https://ojs.aaai.org/index.php/AAAI/article/view/5747.

Dhingra, et al., "Embedding Text in Hyperbolic Spaces," arXiv:1806.04313v1, Jun. 12, 2018, 11 pages; https://arxiv.org/pdf/1806.04313.pdf.

Duvenaud, et al., "Convolutional Networks on Graphs for Learning Molecular Fingerprints," arXiv: 1509.09292v2, Nov. 3, 2015, 9 pages; https://arxiv.org/pdf/1509.09292.pdf.

Fout, Alex M., "Protein interface prediction using graph convolutional networks," PhD diss., Colorado State University 2017, 104 pages; https://mountainscholar.org/bitstream/handle/10217/185661/Fout_colostate_0053N_14473.pdf?sequence=1.

Gulcehre, et al., "Hyperbolic Attention Networks," arXiv preprint arXiv:1805.09786, May 24, 2018, 15 pages; https://arxiv.org/pdf/1805.09786.pdf.

He, et al., "Deep Residual Learning for Image Recognition," Proceedings of the IEEE Conference on Computer Vision and Pattern Recognition 2016, 9 pages; https://openaccess.thecvf.com/content_cvpr_2016/papers/He_Deep_Residual_Learning_CVPR_2016_paper.pdf.

He, et al., "LightGCN: Simplifying and Powering Graph Convolution Network for Recommendation," Proceedings of the International ACM SIGIR Conference on Research and Development in Information Retrieval, arXiv:2002.02126v4, Jul. 7, 2020, 10 pages; https://arxiv.org/pdf/2002.02126.pdf.

Isieh, et al., "Collaborative Metric Learning," Proceedings of the 26th International Conference on World Wide Web 2017, 9 pages; https://vision.cornell.edu/se3/wp-content/uploads/2017/03/WWW-fp0554-hsiehA.pdf.

Jin, et al., "Multi-behavior Recommendation with Graph Convolutional Networks," Proceedings of the 43rd International ACM SIGIR Conference on Research and Development in Information Retrieval 2020, 10 pages; http://staff.ustc.edu.cn/~hexn/papers/sigir20-MBGCN.pdf.

Kearnes, et al., "Molecular graph convolutions: Moving beyond fingerprints," J Comput Aided Mol Des., Aug. 2016, 30(8) doi:10.1007/s10822-016-9938-8, 33 pages; https://www.ncbi.nlm.nih.gov/pmc/articles/PMC5028207/pdf/nihms-812806.pdf.

Khrulkov, et al., "Hyperbolic image embeddings," Proceedings of the IEEE Conference on Computer Vision and Pattern Recognition 2020, 11 pages; https://openaccess.thecvf.com/content_CVPR_2020/papers/Khrulkov_Hyperbolic_Image_Embeddings_CVPR_2020_paper.pdf.

Kipf, et al., "Semi-supervised classification with graph convolutional networks," Proceedings of the International Conference on Learning Representations, arXiv preprint arXiv: 1609.02907v4, Feb. 22, 2017, 14 pages; https://arxiv.org/pdf/1609.02907.pdf?fbclid=lwAROBgJeoKHIAvPuSE9fJ0_IQOEu5175yxyNo7PUC08RTOFlm_llo5YmcnQM.

Krioukov, et al., "Hyperbolic Geometry of Complex Networks," arXiv: 1006.5169v2, Feb. 22, 2017, 18 pages; https://arxiv.org/pdf/1006.5169.pdf.

Li et al., "DeepGCNs: Can GCNs Go as Deep as CNNs?" Proceedings of the IEEE/CVF International Conference on Computer Vision 2019, 10 pages; https://openaccess.thecvf.com/content_ICCV_2019/papers/Li_DeepGCNs_Can_GCNs_Go_As_Deep_As_CNNs_ICCV_2019_paper.pdf.

Li et al., "Symmetric metric learning with adaptive margin for recommendation," Proceedings of the AAAI Conference on Artificial Intelligence 2020, 8 pages; https://ojs.aaai.org/index.php/AAAI/article/view/5894.

Liu et al., "Guided similarity separation for image retrieval," Proceedings of the Neural Information Processing Systems Conference 2019, 11 pages; https://proceedings.neurips.cc/paper/2019/file/7504adad8bb96320eb3afdd4df6e1f60-Paper.pdf.

Liu, et al., "Hyperbolic graph neural networks," Proceedings of the Neural Information Processing Systems, arXiv:1910.12892v1, Oct. 28, 2019, 12 pages; https://arxiv.org/pdf/1910.12892.pdf.

Ma, et al., "Probabilistic Metric Learning with Adaptive Margin for Top-K Recommendation," Proceedings of the 26th ACM SIGKDD International Conference on Knowledge Discovery & Data Mining, arXiv:2101.04849v1, Jan. 13, 2021, 9 pages; https://arxiv.org/pdf/2101.04849.pdf.

Marcheggiani et al., "Encoding Sentences with Graph Convolutional Networks for Semantic Role Labeling," Proceedings of the Conference on Empirical Methods in Natural Language Processing, arXiv preprint arXiv:1703.04826, Jul. 30, 2017, 11 pages; https://arxiv.org/pdf/1703.04826.pdf.

Maximillian, et al., "Learning Continuous Hierarchies in the Lorentz Model of Hyperbolic Geometry," Proceedings of the International Conference on Machine Learning, In International Conference on Machine Learning, PMLR, 2018, 10 pages; http://proceedings.mlr.press/v80/nickel18a/nickel18a.pdf.

Maximillian, et al., "PoincaréEmbeddings for Learning Hierarchical Representations," Advances in neural Information processing systems 30 (2017), 10 pages; https://proceedings.neurips.cc/paper/2017/file/59dfa2df42d9e3d41f5b02bfc32229dd-Paper.pdf.

Mirvakhabova, et al., "Performance of Hyperbolic Geometry Models on Top-N Recommendation Tasks," In Fourteenth ACM Conference on Recommender Systems, 2020, 6 pages; https://dl.acm.org/doi/pdf/10.1145/3383313.3412219.

Niepert, et al., "Learning Convolutional Neural Networks for Graphs," In International conference on machine learning, PMLR, 2016, 10 pages; http://proceedings.mlr.press/v48/niepert16.pdf.

Ravasz, et al., "Hierarchical organization in complex networks," Physical review E 67, No. 2 (2003): 026112, 7 pages; https://arxiv.org/pdf/cond-mat/0206130.pdf.

Sun, et al., "A Framework for Recommending Accurate and Diverse Items Using Bayesian Graph ConvolutionalNeural Networks," 2020 26th ACM SIGKDD Internat'l Conf, 10 pages; https://www.researchgate.net/profile/Jianing-Sun-5/publication/343780326_A_Framework_for_Recommending_Accurate_and_Diverse_Items_Using_Bayesian_Graph_Convolutional_Neural_Networks.

Tay, et al., "Latent Relational Metric Learning via Memory-Based Attention for Collaborative Ranking," Proceedings of the 2018 World Wide Web Conference, 2018, 11 pages; https://dl.acm.org/doi/pdf/10.1145/3178876.3186154.

Tran, et al., "HyperML: A Boosting Metric Learning Approach in Hyperbolic Space for Recommender Systems," Proceedings of the 13th International Conference on Web Search and Data Mining, 2020, 9 pages; https://arxiv.org/pdf/1809.01703.pdf.

Wang, et al., "Neural Graph Collaborative Filtering," Proceedings of the 42nd international ACM SIGIR conference on Research and development in Information Retrieval, 2019, 10 pages; https://arxiv.org/pdf/1905.08108.pdf?ref=https://githubhelp.com.

Wilson, et al., "Gradient descent in hyperbolic space," arXiv preprint arXiv: 1805.08207, Aug. 13, 2018, 10 pages; https://arxiv.org/pdf/1805.08207.pdf.

Xu, et al., "Scene Graph Generation by Iterative Message Passing," Proceedings of the IEEE Conference on Computer Vision and Pattern Recognition, 2017, 10 pages; https://openaccess.thecvf.com/content_cvpr_2017/papers/Xu_Scene_Graph_Generation_CVPR_2017_paper.pdf.

(56) References Cited

PUBLICATIONS

Yang, et al., "Graph R-CNN for Scene Graph Generation," Proceedings of the European conference on computer vision (ECCV), 2018, 16 pages; https://openaccess.thecvf.com/content_ECCV_2018/papers/Jianwei_Yang_Graph_R-CNN_for_ECCV_2018_paper.pdf.
Zhao et al., "PairNorm: Tackling Oversmoothing in GNNs," Proceedings of the International Conference on Learning Representations, arXiv preprint arXiv: 1909.12223v2, Feb. 13, 2020, 17 pages; https://arxiv.org/pdf/1909.12223.pdf.

* cited by examiner

RECOMMENDATION WITH NEIGHBOR-AWARE HYPERBOLIC EMBEDDING

CROSS-REFERENCE TO RELATED APPLICATION

This application claims the benefit of U.S. application No. 63/150,541, filed Feb. 17, 2021, the contents of which are incorporated herein by reference in their entirety.

BACKGROUND

This invention relates generally to recommendation systems, and particularly to recommendation systems using embeddings to generate recommendation scores.

Online systems manage and provide various items to users of the online systems for users to interact with. As users interact with the content items, users may express or reveal preferences for some items over others. The items may be entertainment content items, such as videos, music, or books, or other types of content, such as academic papers or products for purchase. It is advantageous for many online systems to include recommendation systems that suggest relevant items to users for consideration. Recommendation systems can increase frequency and quality of user interaction with online systems by suggesting content that a user is likely to be interested in or will interact with. For example, a recommendation system included in a video streaming server may identify and suggest videos that a user may like based on videos that the user has previously viewed.

In general, models for recommendation systems use preference information between users and items of an online system to predict whether a particular user will like an item. Items that are predicted to be of interest for the user may then be suggested to the user for consideration. Recommendation systems may have millions of users and millions of items in the online system, meaning that individual users' interactions may be sparse because of the very large number of content items. For example, music and book recommendation systems may have hundreds of thousands or millions of individual items that could be recommended (e.g., an individual book or an individual song), while an individual user typically interacts with a very small fraction of the total items (e.g., tens or hundreds of books from among a million books in a repository).

In some recommendation systems, users and/or items may be represented as an embedding (e.g., a multi-dimensional vector) in Euclidian space. These solutions may be ineffective in capturing hierarchical information in the data and may limit the ability for the model to distance negative data points from positive data points during training. As recommendation systems are often used with online systems having very large numbers of users and items, even seemingly small improvements in effective prediction can have significant impact when applied across thousands or millions of users. As such, there is a need for improving predictions in recommendation systems that effectively captures hierarchical information, allows for sufficient distinction between positive and negative data points in training, and benefits from information about related users/items.

SUMMARY

A recommendation system represents users and items within a multidimensional hyperbolic space. To effectively represent users and items, an embedding may be used which includes information based on neighbors of the user/item, termed a neighbor-aware embedding. Predictions for user-item interactions (e.g., a recommendation score) may be generated based on a hyperbolic distance between the neighbor-aware user embedding and the neighbor-aware item embedding in the hyperbolic space.

Combining embedding information in hyperbolic space may have no closed-form solution. To address this difficulty and generate a neighbor-aware hyperbolic embedding, the neighbor-aware information is determined in a tangent space and projected back to the hyperbolic space. User and item interaction information is represented in one embodiment as a sparse graph in which user interactions are characterized by a connection between a user node representing the user and an item node representing the item. When there is no interaction between a user and item, there may be no connection in the graph. Each node (a user or an item) may be associated with an embedding in hyperbolic space that represents the node without neighbor information, termed a local embedding (also termed a "local hyperbolic embedding"). The local hyperbolic embedding may then be modified based on embeddings of connected nodes based on one or more graph convolutions to generate the neighbor-aware embedding for the node (also termed a "neighbor-aware hyperbolic embedding").

As there may be no closed solution for combining (e.g., blending or merging) positions (e.g., different embeddings) in hyperbolic space, the local embedding in hyperbolic space may be converted to a tangent space for the graph convolution. In the graph convolution, the tangent representation may be combined with the tangent representation of nodes connected to the node in the sparse graph. The final tangent representation is then translated back to the hyperbolic space as the neighbor-aware embedding for the node (i.e., for each user and item). In one embodiment, one or more intermediate tangent representations may be generated after each graph convolution. In various embodiments, an intermediate tangent representation may be based on the output of a graph convolution and may further be combined with one or more prior intermediate representations. In various embodiments, the output of a final graph convolution may also be combined with prior intermediate representations to generate the final tangent representation that is translated to the hyperbolic space as the neighbor-aware hyperbolic embedding.

During training of the embeddings, the training algorithm may apply a margin-based training loss to encourage a minimum distance between positive and negative data items, which is more readily performed in the hyperbolic space. In addition, the training may update and backpropagate gradients through to the local embeddings, enabling the local embeddings to effectively capture the effects of the local embedding on its neighbors during the graph convolutions.

By using representations in hyperbolic space, hierarchical information of the user/item interaction data may be more readily represented, while still permitting graph convolutions (in tangent space) to capture information of connected nodes in the sparse graph. Using the hyperbolic space and the margin-based loss, the training algorithm has additional freedom to effectively "lay out" the users and items in the hyperbolic space, taking advantage of the exponentially-increasing distance as an embedding approaches the outer boundary of the hyperbolic space. Compared to prior work in recommendation systems, the recommendations from this approach provide demonstrable improvement.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
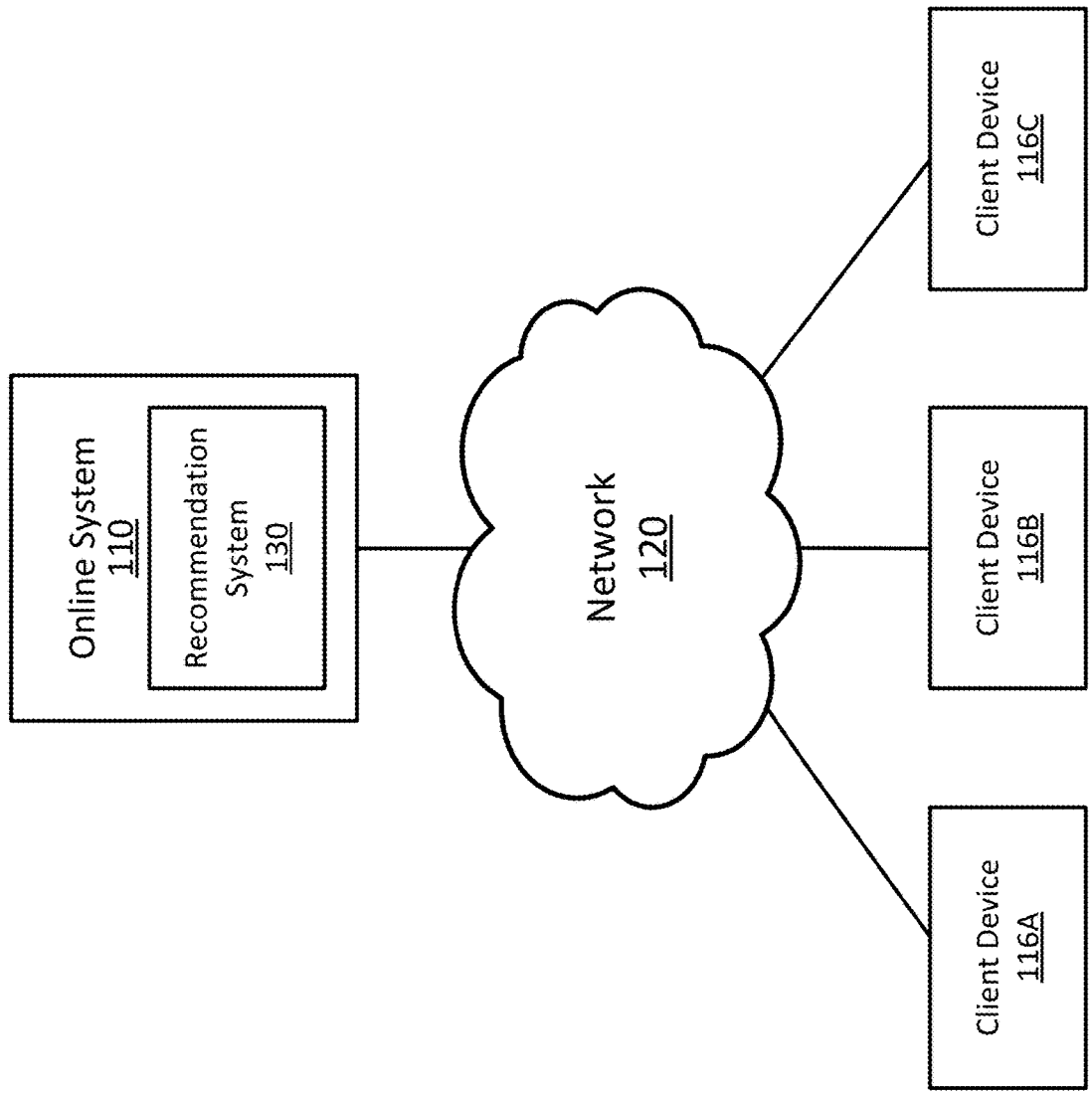
FIG. 1 is a high-level block diagram of a system environment for a recommendation system, in accordance with an embodiment.

FIG. 1 is a high-level block diagram of a system environment for a recommendation system 130, in accordance with an embodiment. The system environment 100 shown by FIG. 1 includes one or more client devices 116, a network 120, and an online system 110 that includes a recommendation system 130. In alternative configurations, different and/or additional components may be included in the system environment 100. In this example, the recommendation system 130 is included within an online system 110 that provides content to users operating client devices 116. Users may also interact with content via the client devices 116, which provide that information to the online system 110. In other embodiments, the recommendation system 130 may provide recommendations (e.g., recommendation scores) without being a part of the online system 110. I.e., the recommendation system may provide recommendations based on user interactions with content as a separate system from an online system 110 that provides content (or content suggestions based on the recommendations) to client devices 116.

The online system 110 manages and provides various items to users of the online systems for users to interact with. For example, the online system 110 may be a video streaming system, in which items are videos that users can upload, share, and stream from the online system 110. As another example, the online system 110 may be an e-commerce system, in which items are products for sale, and sellers and buyers can browse items and perform transactions to purchase products. As another example, the online system 110 may be article directories, in which items are articles from different topics, and users can select and read articles that are of interest.

The recommendation system 130 identifies relevant items that users are likely to be interested in or will interact with and suggests the identified items to users of the online system 110. It is advantageous for many online systems 110 to suggest relevant items to users because this can lead to increase in frequency and quality of interactions between users and the online system 110 and help users identify more relevant items. For example, a recommendation system 130 included in a video streaming server may identify and suggest movies that a user may like based on movies that the user has previously viewed. Specifically, the recommendation system 130 may identify such relevant items based on interaction information received from users as they interact with the online system 110. The interaction information contains preferences for some items by a user relative to other items. The interaction information may be explicitly given by users, for example, through a rating survey that the recommendation system 130 provides to users, and/or may be deduced or inferred by the recommendation system 130 from actions of the user. Depending on the implementation, inferred preferences may be derived from many types of actions, such as those representing a user's partial or full interaction with a content item (e.g., consuming the whole item or only a portion), or a user's action taken with respect to the content item (e.g., sharing the item with another user). In some embodiments, the interaction information is a Boolean value (e.g., zero or one), for example, indicating that a user did or did not interact with the content item. In addition, non-Boolean interaction information may be converted to a Boolean value for use by the recommendation system. For example, a threshold may be applied to a dynamic value, such that values over the threshold constitute an interaction (and a value of 1) and values under the threshold constitute no interaction (and a value of 0).

The recommendation system 130 predicts whether a particular user will like an item (i.e., will interact with an item the user has not previously interacted with) based on the interaction information. In various embodiments, the recommendation system 130 evaluates the likelihood of a user liking the item based on embeddings in a hyperbolic space. The evaluation of a particular item for a particular user may be referred to as a recommendation score. After scoring content items, a number of highest-scoring content items may be selected and recommended to the user, either by suggesting the item or directly presenting the item to the user. The recommendation system 130 may have millions of users and items of the online system 110. Each user typically interacts with a very small percentage, such as 0.1%, 0.01%, or 0.001% or less of the total items. Similarly, while items may vary in popularity, each individual item is typically interacted with by less than 1%, 0.1%, or 0.01% of all users. As such, the interaction data for the users and items is relatively sparse given the large number of users and items for which to successfully generate customized user-item recommendation scores. The hyperbolic embeddings as discussed below provide an effective way to represent users and items for such sparse data while also incorporating neighbor information from other users/items connected by interaction information.

The client devices 116 are computing devices that display information to users and communicates user actions to the online system 110. While three client devices 116A, 116B, 116C are illustrated in FIG. 1, in practice many client devices 116 may communicate with the online system 110 in environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone, or another suitable device. A client device 116 is configured to communicate via the network 120, which may comprise any combination of local area and wide area networks, including wired or wireless connections.

In one embodiment, a client device 116 executes an application allowing a user of the client device 116 to interact with the online system 110. For example, a client device 116 executes a browser application to enable interaction between the client device 116 and the online system 110 via the network 120. In another embodiment, the client device 116 interacts with the online system 110 through an application programming interface (API) running on a native operating system of the client device 116, such as IOS® or ANDROID™.

The client device 116 allows users to perform various actions on the online system 110 and provides interaction information to the recommendation system 130 about content items. For example, user interactions with items presented, selected, or interacted with by the user may be sent to the online system 110.

In one embodiment, the client devices 116 also allow users to rate items and provide preference information on which items the users prefer over the other. For example, a user of a movie streaming system may complete a rating survey provided by the recommendation system 130 to indicate how much the user liked a movie after viewing the movie. For example, the survey may request the user of the client device 116B to indicate the preference using a binary scale of "dislike" and "like," or a numerical scale of 1 to 5 stars, in which a value of 1 star indicates the user strongly disliked the movie, and a value of 5 stars indicates the user strongly liked the movie. However, many users may rate only a small proportion of items in the online system 110 because, for example, there are many items that the user has not interacted with, or simply because the user chose not to rate items.

Interaction information is not limited to explicit user ratings and may also be included in other types of information, such as action information, provided to the recommendation system 130. For example, a user of a video streaming system that stops viewing a video after a short amount of time may be considered a negative interaction with the video, even though the user may not have submitted a bad rating for the video. Similarly, a user watching a video to completion may be considered a positive interaction with the video without an explicit positive rating provided by the user.

The client devices 116 also receive item recommendations for users that contain items of the online system 110 that users may like or be interested in. The client devices 116 may present recommendations to the user when the user is interacting with the online system 110, as notifications, and the like. For example, video recommendations for a user may be displayed on portions of the web site of the online system 110 when the user is interacting with the web site via the client device 116. As another example, client devices 116 may notify the user through communication means such as application notifications and text messages as recommendations are received from the recommendation system 130.

Figure 2:
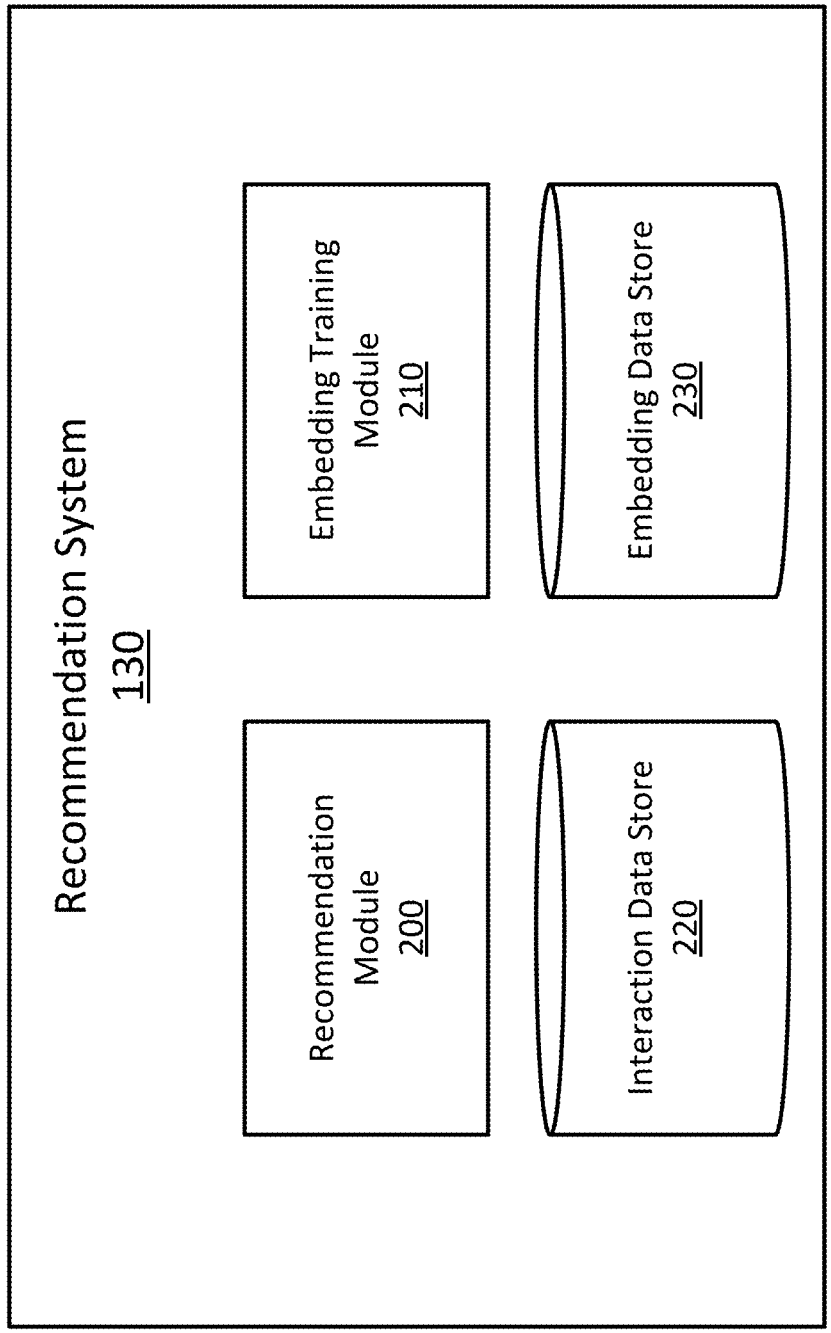
FIG. 2 is an example block diagram of an architecture of the recommendation system, in accordance with an embodiment.

FIG. 2 is an example block diagram of an architecture of the recommendation system 130, in accordance with an embodiment. The recommendation system 130 shown by FIG. 2 includes a recommendation module 200, an embedding training module 210, an interaction data store 220, and an embedding data store 230. In alternative configurations, different and/or additional components may be included in the system environment 100. As such, while the present discussion emphasizes aspects of the recommendation system 130, in practice such systems (along with online system 110) may include additional modules, databases, and features. In addition, while the recommendation score discussed below generally discusses using embeddings in a hyperbolic space learned from interaction data, the embeddings may further be trained with additional features, and similarly additional features may also be incorporated into the determination of a recommendation score for predicting a user's likely interaction with a content item.

The interaction data store 220 manages interaction information for users of the online system 110. In other examples, the interaction information may not be managed by the recommendation system 130, and may be provided to the recommendation system 130 as a data set from an external source. In one embodiment, the interaction information may be represented (or transformed to represent) a sparse graph of nodes, each representing a user or an item. The interaction information between users and nodes may be represented as connections between the nodes. When there is a positive interaction between a user and an item (e.g., a user interacted with an item), a connection is created in the graph between the node associated with that user and the node associated with that item. In embodiments, the connection between users and items is Boolean, such that a connection is created when there is an interaction, and no connection exists when there is no interaction. As discussed above, the percentage of items interacted with by each user, as well as the percentage of users interacting with each item is typically very low, yielding a sparse graph with few connections relative to the total number of users and items.

As such, the interaction data store 220 includes data about a set of m users $U=\{u_1, \ldots, u_m\}$ and n items $I=\{i_1, \ldots, i_n\}$. The interaction graph may also be represented as a sparse interaction matrix R, having dimensions m×n in which Rui has a value of 1 when there is an interaction and 0 otherwise. As further discussed below, based on the interaction matrix/graph, each user/item may be associated with a "neighborhood" of other items/users. The neighborhood is defined in one embodiment by the set of nodes connected to the node in the interaction graph. As such, in this embodiment an item's neighborhood $N_i$ is the set of users who interacted with the item, and likewise a user's neighborhood $N_u$ is the set of items the user interacted with. In the matrix representation, an item's neighborhood $N_i$ is the set of items for which $R_{ui}=1$, and a user's neighborhood $N_u$ is the set of users for which $R_{ui}=1$. Formally, $N_u=\{i \in I: R_{ui}=1\}$ and $N_i=\{u \in U: R_{ui}=1\}$.

The embedding data store 230 maintains a set of embeddings in a hyperbolic space. Each embedding represents a location in the hyperbolic space for an item or user. Each item and user may be represented with a local embedding $\theta$ and a neighbor-aware embedding $\psi$. The local embedding $\theta$ is a representation of the particular item or user in the hyperbolic space before consideration of information related to the Neighborhood N. After modification of the embedding with neighborhood information as discussed below, the neighbor-aware embedding $\psi$ is determined to represent the associated user or item. As such, a local user embedding in the hyperbolic space is represented as $\theta_u$ and a neighbor-aware user embedding is represented as $\psi_u$. Similarly, the local item embedding is $\theta_i$ and the neighbor-aware item embedding is $\psi_i$. For a particular user u and item i, the neighbor-aware embeddings $\psi_u$ and $\psi_i$ may then be used in the determination of a recommendation score. As shown and discussed below, these learned representations capture meaningful structure for the set of users and items latent in the interaction data and provide improved recommendation performance relative to prior recommendation systems.

The hyperbolic space in which the embeddings are represented is an n-dimensional multi-dimensional space $\mathcal{H}^d$, and may be represented in various mathematical formulations, such as the Lorentz formulation and the Poincaré formulation. Though such spaces may be difficult to effectively visualize, hyperbolic spaces are generally defined as a Reimann manifold $\mathcal{M}$ having a constant negative curvature c. As an example, for a hyperbolic plane having a constant negative curvature, each point on the plane is a saddle point, such that different directions of the plane away from the point curve in opposite ways (i.e., away from one another). This may be contrasted to a Euclidian plane in which there is zero curvature (i.e., no curvature in different directions), or an elliptical plane having a constant positive curvature (multiple directions away from a point curve in the same direction, typically forming a sphere). In the hyperbolic space, the negative curvature c is typically −1, but may be another non-zero negative value. Discussions below may also use the negative reciprocal of the curvature, k, defined as −1/c. Although hyperbolic space may be equivalently represented in various models, the Lorentz formulation is used in one embodiment, such that the hyperbolic space $\mathcal{H}^d$ is defined by:

$$\mathcal{H}^d = \{x \in \mathbb{R}^{d+1} : \langle x,x \rangle_\mathcal{L} = -k, x_0 > 0\}$$

Equation 1 where $\langle x, y \rangle_\mathcal{L}$ is the Lorentz inner product given by $\langle x,y \rangle_\mathcal{L} = -x_0 y_0 + \Sigma_{i=1}^d x_i y_i$ for $x,y \in \mathbb{R}^{d+1}$ and the metric tensor is $g_\mathcal{L} = \text{diag}[-1, 1, 1, \ldots, 1]$. As such, the distance $d_\mathcal{L}$ between two points x, y in the Lorentz model of hyperbolic space $\mathcal{H}^d$ is calculated by:

$$d_\mathcal{L}(x, y) = \sqrt{k}\, \text{arcosh}\left(-\frac{\langle x, y \rangle_\mathcal{L}}{k}\right)$$

Equation 2

In addition to the representation in hyperbolic space, a point x on a manifold $\mathcal{M}$ in hyperbolic space may be described as a tangent space $\mathcal{T}_x \mathcal{M}$ as a d-dimensional Euclidean space approximating $\mathcal{M}$ around x with elements of $\mathcal{T}_x \mathcal{M}$ referred to as tangent vectors v. In the Lorentz model of hyperbolic space $\mathcal{H}^d$, the tangent space at point x is defined by:

$$\mathcal{T}_x \mathcal{H}^d = \{v \in \mathcal{R}^{d+1} : \langle v,x \rangle_\mathcal{L} = 0\}$$

Equation 3

The hyperbolic space may also be represented in a Poincare representation $\mathcal{B}^d$ as an open sphere, including points x: $\{x \in \mathbb{R}^d : \|x\| < k\}$ where the curvature $c = -1/k < 0$ and where $\|.\|$ is the Euclidean norm. Distances in the Poincare representation $\mathcal{B}^d$ may be measured between points x, y as:

$$d_{\mathcal{B}(x,y)} = \sqrt{k}\, \text{arcosh}\left(1 + 2k \frac{\|x-y\|^2}{(k - \|x\|^2)(k - \|y\|^2)}\right)$$

Equation 4

As one example of transformations between different hyperbolic space representations, the Lorentz representation may be transformed to the Poincare representation as follows:

$$\mathcal{PL} \to \mathcal{B}(x) = \mathcal{PL} \to \mathcal{B}(x_0, x_1, \ldots, x_d) = \sqrt{k}\frac{(x_1, \ldots, x_d)}{x_0 + \sqrt{k}}$$

Equation 5

The recommendation module 200 may use the embeddings for users and items to generate recommendation scores and select one or more items to recommend (or automatically present) to a particular user. For a given user, the recommendation score may be evaluated for a set of items, which may include all possible items or a subset thereof. For each evaluated item, the recommendation score is generated for the user u and the item i. In one embodiment, the recommendation score is determined based on the hyperbolic distance between the neighbor-aware user embedding $\psi_u$ and the neighbor-aware item embedding $\psi_i$. The hyperbolic distance may be determined according to the respective distance calculation discussed above. For example, in the Lorentz representation, the distance may be calculated as $d_\mathcal{L}(\psi_u, \psi_i)$ of Equation 2. In some embodiments, the distance between the neighbor-aware embeddings in hyperbolic space is used as the recommendation score itself. In other embodiments, additional factors may also be considered, such as additional characteristics or features of the user or item.

In some circumstances, the recommendation module 200 may also determine a neighbor-aware embedding for a user or item based on the local embedding and/or the interaction data in the interaction data store 220. As discussed more fully below, the neighbor-aware embeddings may be generated in one embodiment based on one or more graph convolutions using the user and item neighborhoods N. While this may be performed during training of the local hyperbolic embedding and neighbor-aware hyperbolic embedding (e.g., by the embedding training module 210), in some circumstances the recommendation module 200 may also determine an embedding after the embeddings have been trained for items and users. For example, when a new user or item is added, the user or item may not yet have been included in the embedding training. In some embodiments, although there is no local hyperbolic embedding trained for the new item or user, when there are interactions for the new item/user in the interaction data store 220, the neighbor-aware hyperbolic embedding may still be determined based on the embeddings of its neighbors based on the graph convolutions.

The embedding training module 210 trains the neighbor-aware hyperbolic embeddings and the local hyperbolic embedding θ for each item and user. To perform the training, local hyperbolic embeddings θ may first be initialized, after which they may be trained based on the interaction data. Neighbor-aware embeddings are generated based on the neighbors of each user/item and recommendation scores are generated for user-item pairs using the neighbor-aware embeddings. An error is determined between the recommendation scores and the actual interactions of the user-item pairs (i.e., Rui in the sparse interaction matrix for each u-i pair). The embedding training module 210 modifies the embeddings to reduce the determined error. Further details on the training process are discussed below, which may include using a margin-based error.

Figure 3:
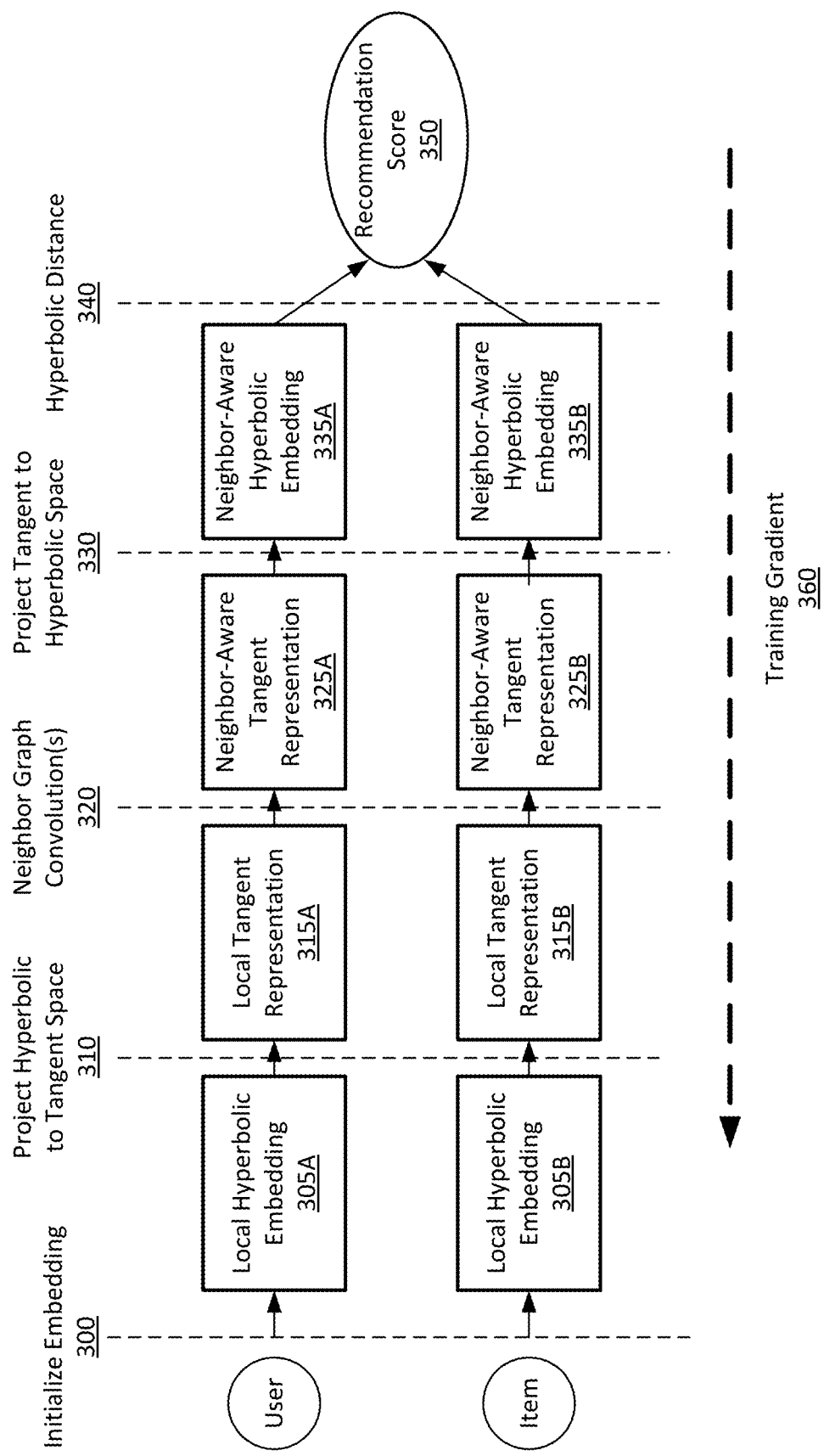
FIG. 3 provides overview of the process for training and using neighbor-aware hyperbolic embeddings in generating recommendation score for a user with respect to an item, according to one embodiment.

FIG. 3 provides overview of the process for training and using neighbor-aware hyperbolic embeddings in generating recommendation score for a user with respect to an item, according to one embodiment. As discussed above, to generate the recommendation score 350, the neighbor-aware hyperbolic embedding 335A for a user $\psi_i$ and a neighbor-aware hyperbolic embedding 335B for an item $\psi_i$ may be based on the hyperbolic distance 340 applied to the respective embeddings (e.g., $d_\mathcal{L}(\psi_u, \psi_i)$). As noted above, in general, hyperbolic spaces may be represented in various ways; while the Lorentz formulation and distance is shown here, the hyperbolic space may be represented in alternate ways in varying embodiments and use an appropriate distance metric for that representation.

Neighbor-Aware Hyperbolic Embeddings

FIG. 3 shows the process for generating the recommendation score and training the local hyperbolic embeddings 305A, B and (respectively) the neighbor-aware hyperbolic embeddings 335A, B. Initially, the embeddings for the set of users and set of items may be initialized 300. To initialize the embeddings, the embeddings may be determined with a randomized or semi-randomized selection of a point in the hyperbolic space. As such, in one embodiment, the embeddings are initialized by sampling from a probability distribution. As distances in the hyperbolic space increase exponentially towards the exterior curvature of the surface, the probability distribution may be centered at an origin o of the hyperbolic space. In the Lorentz representation of hyperbolic space $\mathcal{H}^d$, the origin o may be defined as:

$$o = (\sqrt{k}, 0, \ldots, 0) \in \mathcal{H}^d.$$

In certain hyperbolic spaces, it may not be effective to select or manipulate points on the hyperbolic space directly in a closed-form solution. In one embodiment, embeddings are initialized in a tangent space and then translated to the hyperbolic space to generate the local hyperbolic embeddings 305. As further discussed below, the tangent representation may also be used to manipulate the hyperbolic embeddings in one or more neighbor graph convolutions 320. Equation 3 above shows an example tangent space defined for the Lorentz model.

As such, initialization 300 of the local hyperbolic embeddings 305 (also denoted $\theta_u$ for any local hyperbolic user embedding such as embedding 305A and $\theta_i$ for any local hyperbolic item embedding such as 305B) for the items and users may be performed in one embodiment by sampling in the tangent space and translating the sampled values to the hyperbolic space. To sample the embeddings in the tangent space in one embodiment, the sampling is performed by sampling values from a multivariate Gaussian distribution around the origin o of the space as a reference point. In this embodiment, the initialization of a tangent representation for a user or item (generically, for a point $\theta$ initialized in tangent space $\mathcal{T}_o \mathcal{H}^d$) may be determined by prepending a zero to the multivariate Gaussian sampling:

$$\mathcal{T}_o \mathcal{H}^d = [0, \sim N(0, \sigma I_{d \times d})] \quad \text{Equation 6}$$

The initialized point in tangent space may then be projected into the corresponding hyperbolic space to determine the initial local hyperbolic embedding $\theta$ for a user $\theta_u$ or item $\theta_i$. The particular formula for the projection may vary according to the particular tangent and hyperbolic representations. In one embodiment, the projection in tangent space to hyperbolic space ($\mathcal{T}_x \mathcal{H}^d \to \mathcal{H}^d$) for a point x, having tangent vectors v, is an exponential mapping $\exp_o$ around a reference point, here the origin, defined by:

$$\exp_o(v) = \cosh\left(\frac{\|v\|_\mathcal{L}}{\sqrt{k}}\right) o + \sinh\left(\frac{\|v\|_\mathcal{L}}{\sqrt{k}}\right) \frac{v}{\|v\|_\mathcal{L}} \quad \text{Equation 7}$$

As such, in one embodiment the initialization of 300 of the local user hyperbolic embedding 305A and local item hyperbolic embedding 305B may be performed by sampling a point in tangent space according to Equation 6 and projecting the point to hyperbolic space according to Equation 7. In other embodiments, alternate approaches for generating initial hyperbolic points may be used, such as different sampling approaches, and different tangent and hyperbolic space models. While one example user and item are shown here, a local hyperbolic embedding may be initialized for every item and every user.

In one embodiment, the local user and item embeddings in hyperbolic space are processed similarly to generate the respective neighbor-aware hyperbolic embeddings 335A, B. To incorporate information from neighbors N of a user and item, one or more neighbor graph convolutions 320 may be performed on the local embeddings to generate the neighbor-aware embeddings. However, incorporating spatial information in a hyperbolic space may have no closed-form solution and may be otherwise difficult to directly compute. As such, in one embodiment, the neighbor information is incorporated in tangent space. To do so, the local hyperbolic embeddings 305A, B are converted to a local tangent representation 315A, B by projecting the hyperbolic space to a tangent space 310. The projection to tangent space may vary according to the particular model for hyperbolic and tangent space. In the example of hyperbolic space $\mathcal{H}^d$, the projection to tangent space may be determined by a logarithmic map $\log_o(x)$ for point x at with respect to the origin o as:

$$\log_o(x) = \sqrt{k} \operatorname{arcosh}\left(-\frac{\langle o, x \rangle_\mathcal{L}}{k}\right) \frac{x + \frac{1}{k}\langle o, x \rangle_\mathcal{L} o}{\left\| x + \frac{1}{k}\langle o, x \rangle_\mathcal{L} o \right\|_\mathcal{L}} \quad \text{Equation 8}$$

Equation 8 provides one mapping for hyperbolic space to tangent space and may vary in other representations.

After projection to hyperbolic space, the local tangent representation for each user 315A and/or item 315B aggregates information from its neighbors in the sparse matrix/graph to generate corresponding neighbor-aware tangent representations 325A and 325B, respectively. Generally, the neighbor aggregation combines the positional information for the item/user with the positional information of its neighbors. The positional information may also be aggregated across several degrees of separation, such that higher-order relationships may be gathered by combining information from immediate, directly-connected neighbors in the interaction matrix/graph (e.g., having a degree of separation of 1) in addition to more remote neighbors (e.g., connections of connections, etc.). The neighbor information may be combined across users and items and may be combined in various ways, for example, combining positional information for user A with positional information of item B, connected to user A, in addition to the positional information of user C who also interacted with item B and so forth. The position information thus may, for example, blend the position of an item/user with the positions of its neighbors (and the neighbor's neighbors, etc.). In addition, the weight of a neighbor's embedding in the combination may be a function of the distance of the neighbor from the immediate node, such that higher degrees of separation for a neighbor reduces its weight in the combination.

The aggregation of neighbor information may thus take various mathematical forms, one embodiment of which is termed a neighbor graph convolution. Generally, in each neighbor graph convolution, the output position (e.g., the output tangent representation) for each item/user is based on the value of an input position and the input position of its neighbors. The neighbor graph convolutions may be performed several times, such that each neighbor graph convolution represents a "layer" and incorporates information from increasingly distant neighbors. In various implementations, one or more layers L of neighbor graph convolution 320 may be applied to generate the neighbor-aware tangent representations 325. Though shown in FIG. 3 as relating to one user and one item to generate neighbor-aware tangent representations 325A, 325B, the neighbor graph convolutions may be applied to all users and items to sequentially generate outputs from layers of applying the graph convolution. Embodiments of the neighbor graph convolutions are discussed in further detail in FIGS. 4, 5A, and 5B. After aggregating neighbor information, the final neighbor-aware tangent representation 325 is projected back to hyperbolic space 330 to determine the neighbor-aware hyperbolic embedding 335, shown in FIG. 3 as neighbor-aware hyperbolic embedding 335A for a user and neighbor-aware hyperbolic embedding 335B for an item. The projection from tangent space to hyperbolic space may be performed as discussed above, for example according to Equation 7. To generate the recommendation score 350 for a particular user-item combination, the hyperbolic distance 340 is determined between the respective neighbor-aware user hyperbolic embedding 335A and the neighbor-aware hyperbolic embedding 335B for the user and item respectively.

The recommendation module 200, as discussed above, may use the trained neighbor-aware hyperbolic embeddings 335A, B directly to generate a recommendation score 350, and may use the local hyperbolic embeddings in certain circumstances to update the neighbor-aware embeddings $\psi$ by performing the neighbor aggregation (e.g., the neighbor graph convolutions 320) without retraining the relevant local hyperbolic embeddings $\theta$. This may be useful, for example, when the interaction data is updated with additional interactions between users and items, and permit updates to account for such interaction data without retraining the set of local hyperbolic embeddings.

When training the hyperbolic embeddings, a training gradient 360 (e.g., training error) may be backpropagated from the predicted recommendation score 350 through the neighbor-aware tangent representations to modify the local hyperbolic embeddings for items and users. As such, the training may effectively modify the local hyperbolic embeddings 305 that underly the neighbor-aware hyperbolic embeddings 335, while in application of the recommendation system 130 in runtime operation of the online system 110, the neighbor-aware hyperbolic embeddings 335 may be directly used for generating high-accuracy recommendation scores and subsequent content selection/recommendation. Further discussion of the training process is provided with respect to FIG. 6A-6B.

Neighbor Graph Convolutions

Figure 4:
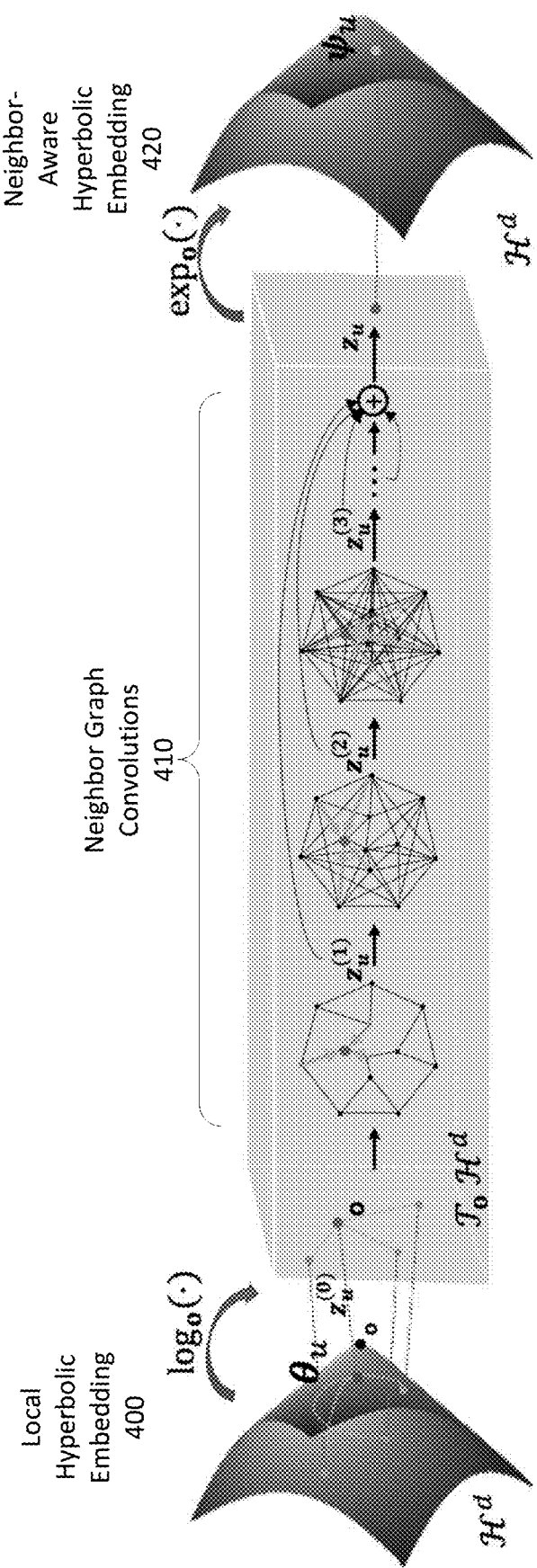
FIG. 4 illustrates an example of using the tangent representation for graph convolutions for embeddings in hyperbolic space, according to one embodiment.

FIG. 4 illustrates an example of using the tangent representation for graph convolutions for embeddings in hyperbolic space, according to one embodiment. As just discussed, the local hyperbolic embedding 400 may be projected to a tangent representation for neighbor aggregation, such as via one or more graph convolutions 410. After the graph convolution(s) 410, the final neighbor-aware tangent representation may be converted back to hyperbolic space as a neighbor-aware hyperbolic embedding 420.

FIG. 4 shows an example of generating the neighbor-aware hyperbolic user embedding $\psi_u$, from the local hyperbolic user embedding $\theta_i$. As illustrated in FIG. 4, the hyperbolic space $\mathcal{H}^d$ is curved such that points further from the origin o increase in distance exponentially along the curved space. To initiate neighbor aggregation, the local hyperbolic user embedding $\theta_u$ is projected to the tangent space (e.g., via the logarithmic mapping of Equation 8) to generate the local tangent representation $z_u^{(0)}$. As each graph convolution is performed on the tangent representation, additional tangent representations are generated by each layer, such that the input to a graph convolution layer l is $z_u^{(l)}$ and outputs $z_u^{(l+1)}$. Hence, as shown in FIG. 4, after the first graph convolution layer (layer 1) on the local user tangent representation $z_u^{(0)}$, the subsequent tangent representation is designated $z_u^{(1)}$.

The graph convolution may combine information from user or item neighbors N in various ways depending on the embodiment. In one embodiment, the graph convolution combines the tangent representation of the user with the set of neighboring item tangent representations normalized by the number of neighbors. The previous layer's user tangent representation may be combined with the neighbor tangent representations in various other ways, for example, by weighing or blending the neighbors in other ways. One example for the user graph convolution is:

$$z_u^{(l+1)} = z_u^{(l)} + \sum_{i \in N_u} \frac{1}{|N_u|} z_i^{(l)} \qquad \text{Equation 9}$$

In the embodiment shown by Equation 9, a neighbor graph convolution generates a subsequent layer for a user tangent representation $z_u^{(l+1)}$ as a combination of the prior layer's user tangent representation $z_u^{(l)}$ with the prior layer's tangent representation of the set of items $z_i^{(l)}$ in the user's neighborhood $N_u$. The tangent representation of the neighboring items may be normalized to prevent the scale of the embeddings from significantly increasing with the number of layers. At each convolutional layer, the tangent representation of the set of users and the set of items is updated. As such, at each layer, while the user tangent representation is modified by nearby items, the tangent representation of neighbor items are also modified by the respective item's neighborhood $N_i$ of users. Thus, as each graph convolution "pulls" information from its neighbors which are themselves "pulling" information from its neighbors, each subsequent graph convolution may incorporate information from neighbors that are increasingly further from the local embedding, thus enabling the neighbor-aware representation to account for higher order relationships in the underlying interaction data.

FIG. 4 shows a second and third graph convolution layers further generating user tangent representations $z_u^{(2)}$ and $z_u^{(3)}$, respectively. FIG. 4 also graphically shows that as additional graph convolutions 410 are applied, position information from increasingly distant neighbors modify the user tangent representation. After the neighbor graph convolutions, a final neighbor-aware tangent representation $z_u$ is determined, which may then be projected back to the hyperbolic space, such as by the exponential mapping of Equation 7. As shown in FIG. 4 and further discussed with respect to FIG. 5B, the final tangent representation may be a combination of more than one tangent representation from prior layers, termed intermediate tangent representations.

While FIG. 4 shows an example graph convolution for a user, similar processes may be performed on item tangent representations to generate a neighbor-aware item tangent representation. For example, the local item tangent representation $z_i^{(0)}$ may be generated by a projection of the item's local hyperbolic embedding $\theta_i$ to a tangent representation. Similarly, a graph convolution for an item may be determined by similar means as discussed above for a user, and in an embodiment using Equation 9, with a corresponding equation for item neighbor graph convolution:

$$z_i^{(l+1)} = z_i^{(l)} + \sum_{u \in N_i} \frac{1}{|N_i|} z_u^{(l)}$$

Equation 10

In addition, while FIG. 3 and FIG. 4 show the local hyperbolic embedding converted to tangent space from the local hyperbolic embedding, in some embodiments, the initialized embedding in tangent space or local tangent representation $z^{(0)}$ (i.e., the tangent representation prior to aggregating neighbor information) is used directly, without projecting hyperbolic space to update the local hyperbolic embedding θ. For example, when the embeddings are initialized 300 in the tangent space, the initialized values may be used directly as the local tangent representation $z^{(0)}$, rather than projecting to the local hyperbolic embedding θ and projecting the local hyperbolic embedding θ back to the local tangent representation $z^{(0)}$.

Figure 5B:
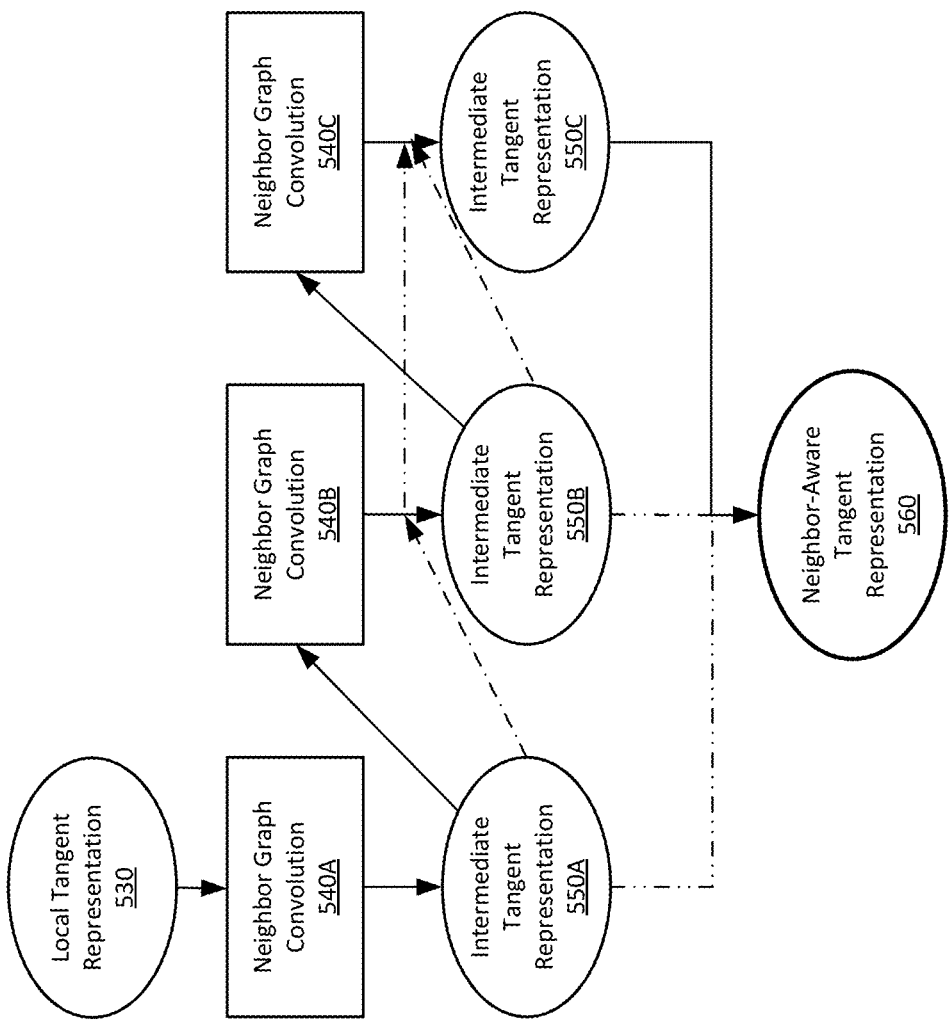
FIGS. 5A and 5B show example flows for generating a neighbor-aware tangent representation, according to some embodiments.
Figure 5A:
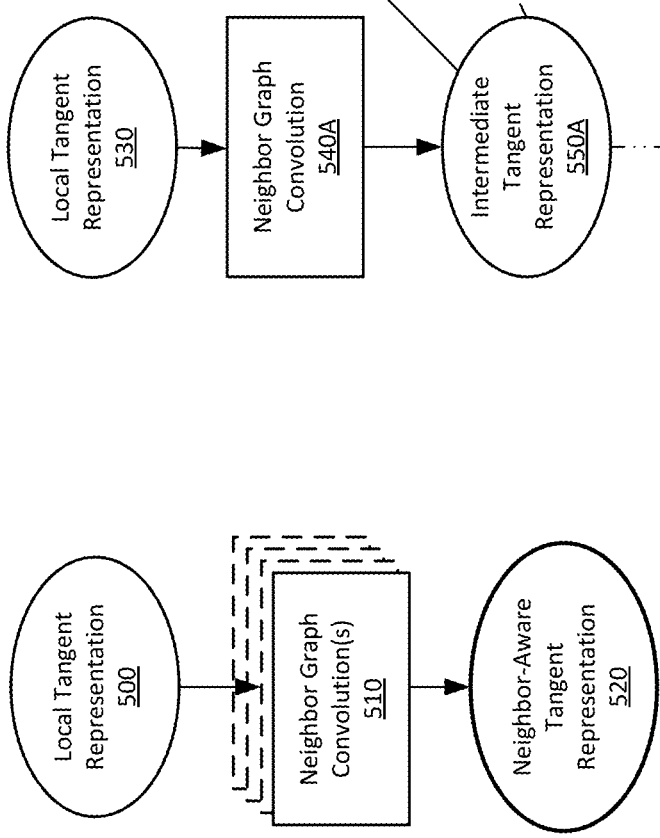

FIGS. 5A and 5B show example flows for generating a neighbor-aware tangent representation, according to some embodiments. FIG. 5A shows an example in which the local tangent representation 500 may be processed by one or more neighbor graph convolutions 510 to generate the neighbor-aware tangent representation 520. In the example of FIG. 5A, the neighbor graph convolutions may be sequentially applied to each prior layer, and the output of the final graph convolution may be used directly as the final neighbor-aware tangent representation 520.

FIG. 5B shows an example in which the tangent representations of earlier layers may affect the tangent representations of a subsequent layer, in which the final neighbor-aware tangent representation 560 may also incorporate intermediate tangent representations from prior layers. While FIG. 5B shows one example with three neighbor graph convolutions 540, more or fewer neighbor graph convolutions 540 and intermediate tangent representations 550 may be used. As with prior neighbor graph convolutions, initially a local tangent representation 530 may be input to a first neighbor graph convolution 540A to generate an intermediate tangent representation 550A. As with the sequential neighbor graph convolutions, each intermediate tangent representation 550 may be provided to the subsequent neighbor graph convolution; such that intermediate tangent representation 550A is input to the neighbor graph convolution 540B and intermediate tangent representation 550B is input to the neighbor graph convolution 540C.

FIG. 5B further shows that the intermediate tangent representation of one or more prior layers may be combined with the output of a neighbor graph convolution 540 to generate the resulting intermediate tangent representation 550. In this example, the resulting intermediate tangent representation 550B for the second layer of neighbor graph convolution 540B may also be affected by the intermediate tangent representation 550A of a prior layer (here, layer 1). As another variation, the intermediate tangent representation 550C generated by the third graph convolution 540C may be affected by the two prior intermediate tangent representations 550A-B. The prior intermediate tangent representations may thus be combined with the output of the neighbor graph convolution 540 to generate subsequent tangent representations. These may be combined as a sum, a mean, or by any other suitable means for combining the positional values of the tangent representations.

Similarly, the final neighbor-aware tangent representation 560 may combine one or more intermediate tangent representations 550 from prior layers. As with the intermediate tangent representations 550, these may be combined in various ways, such as a sum or a mean. In one example, the neighbor-aware tangent representation is determined from intermediate tangent representations of L layers of neighbor graph convolution by:

$$z_u = z_u^{(L)} + z_u^{(L-1)} + \ldots + z_u^{(1)}$$

Equation 11

As shown by Equation 11, the neighbor-aware tangent representation may sum the values from each prior intermediate tangent representation. This is also illustrated in FIG. 4 in which intermediate representations $z_u^{(1)}$, $z_u^{(2)}$, $z_u^{(3)}$ ... are combined to generate the final user tangent representation $z_u$. As additional graph convolutions are applied, the original signal of the local hyperbolic embedding (or local tangent representation) may be diluted by the neighbor information. By including earlier layers' intermediate tangent representations 550 in determining the neighbor-aware tangent representation 560, additional neighbor graph convolutions can be performed without overly smoothing information from the local representation.

As with the graph convolutions, the combination of tangent representations for the neighbor-aware tangent representation 560 or the inclusion of prior intermediate tangent representations in determining a later layer's tangent representation 550 (e.g., 550B, 550C) may be normalized or otherwise weighted to prevent the addition from increasing the scale of the related values.

Finally, various embodiments may include various combinations of prior intermediate tangent representations (including none) for determining an intermediate tangent representation 550 or the final neighbor-aware tangent representation 560. For example, embodiments may include various patterns or combinations of prior intermediate tangent representations in determining the intermediate tangent representation of a current layer. As such, the output of a neighbor graph convolution may be combined with any, all, or none of the prior intermediate tangent representations 550 in determining the intermediate tangent representation for the current layer. Similarly, the neighbor-aware tangent representation 560 may use any combination of prior layer tangent representations in generating the neighbor-aware tangent representation 560.

Embedding Training

As noted above, the embedding training module 210 may train the neighbor-aware hyperbolic embedding and the local hyperbolic embedding θ for each item and user. After initializing the embeddings, the neighbor-aware hyperbolic embeddings may be generated for users and items and used to generate recommendation scores. The sparse matrix may be used as "ground truth" such that an error is determined based on the recommendation score of a user-item pair compared to the known interaction information between that user and item. A cost function may be generated to affect the error back propagated to modify the embeddings. Intuitively, the effect of the training is to "position" the users and items in the hyperbolic space (i.e., via the embeddings) to place similar users and items near one another. As such, gradients for the error optimally pull users and items closer to one another in the embedding space when there is a positive interaction and away from one another when there is a negative interaction (e.g., no interaction by the user for the item).

Figure 6A:
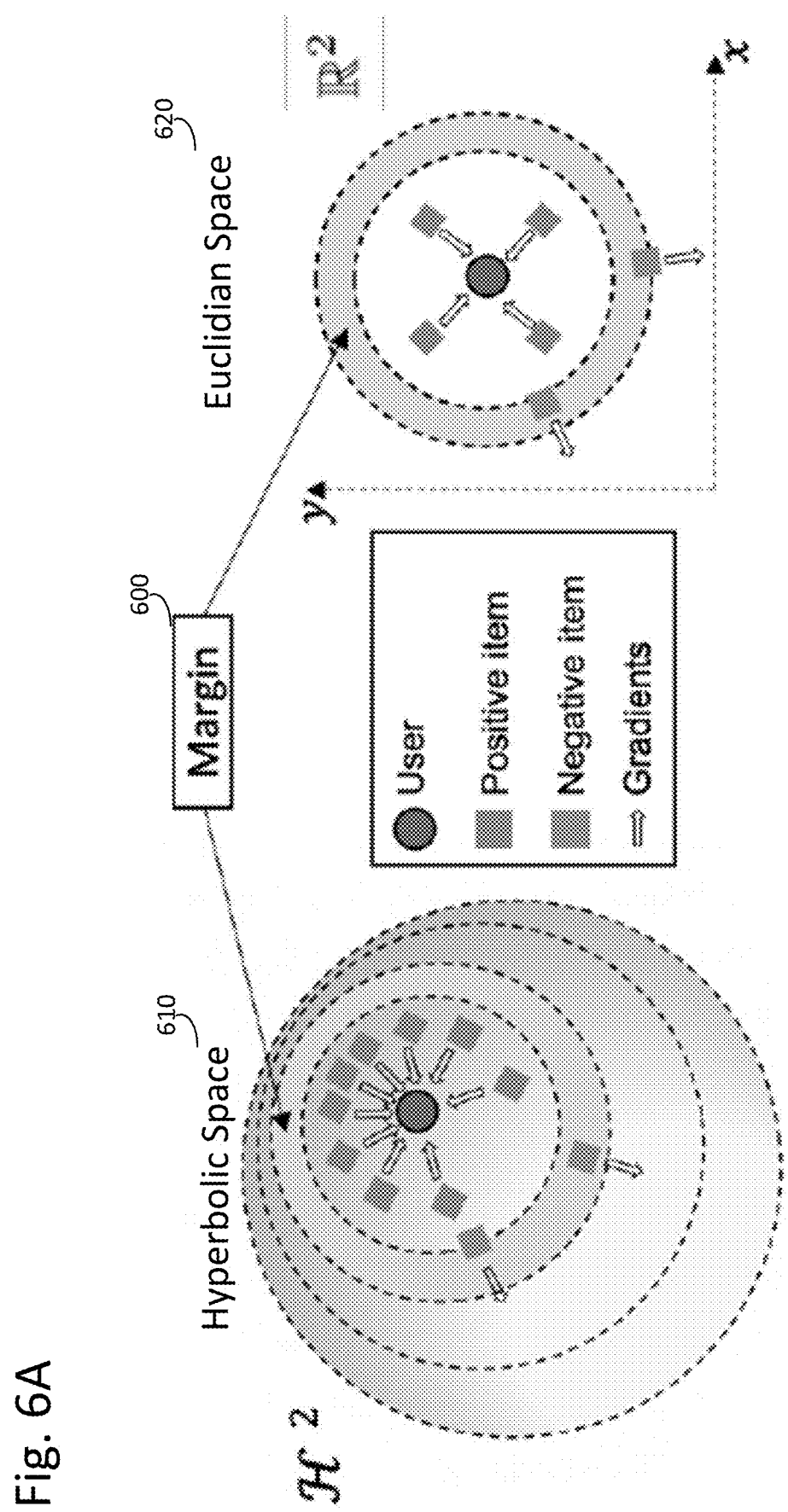
FIGS. 6A and 6B illustrates example embedding training in a hyperbolic space.
Figure 6B:
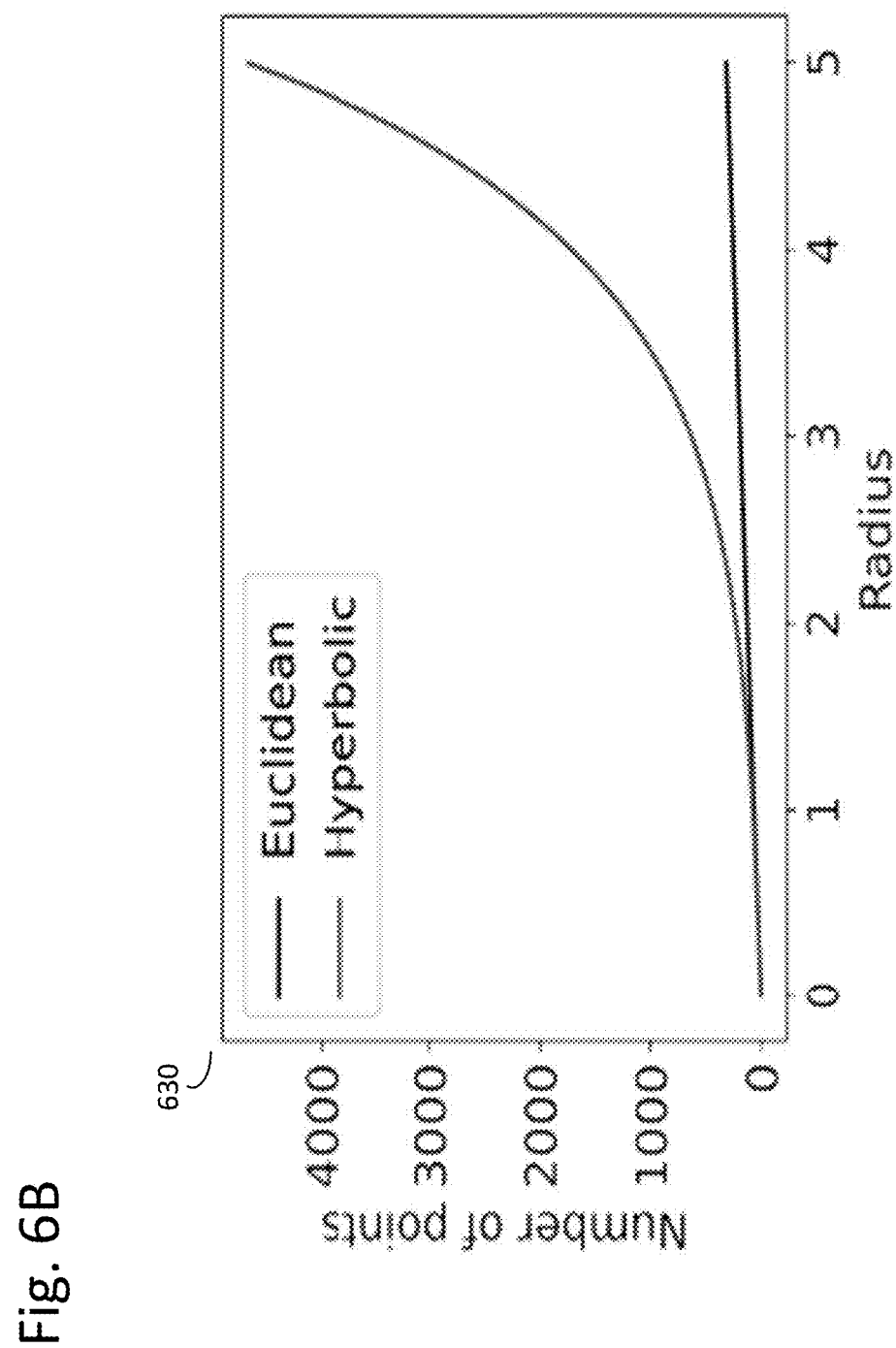

FIGS. 6A and 6B illustrates example embedding training in a hyperbolic space. In the example of FIG. 6A, a margin-based loss 600 is shown with respect to its effects in hyperbolic and in Euclidian space. In a margin-based loss, the loss function for training focuses on separating positive and negative user-item pairs by a minimum distance (a "margin"). When negative items are further than the margin, they no longer contribute to the loss function. In addition, this permits the loss function to focus on "difficult" user-item pairs in which the user and item appear to have a high recommendation score despite a negative interaction, or conversely an item which has a low recommendation score despite a positive interaction. As one example of applying a margin-based loss in hyperbolic space, the following provides an example loss function L for a user with respect to an item i having a positive interaction ($R_{ui}=1$) and an item j having a negative interaction ($R_{uj}=0$):

$$L(u,i,j)=\max(d_{\mathcal{L}}(\psi_u,\psi_i)^2 - d_{\mathcal{L}}(\psi_u,\psi_j)^2 + m, 0)$$ Equation 12

In Equation 12, $d_{\mathcal{L}}(\psi_u,\psi_i)$ is the hyperbolic distance between the neighbor-aware hyperbolic embedding for user u and item i. Similarly, $d_{\mathcal{L}}(\psi_u,\psi_j)$ is the hyperbolic distance between the neighbor-aware hyperbolic embedding for user u and item j. As such, Equation 12 provides an example for providing a margin-based loss that decreases as the distance from the user to the negative item increases relative to the distance from the user to the positive item and becomes zero when the distance between positive and negative item (with respect to the user) is higher than the margin m.

FIG. 6A shows the beneficial effect of the margin-based loss 600 in a hyperbolic space 610 relative to a Euclidian space 620. In the hyperbolic space 610, as embeddings move towards the edge (e.g., as represented in a Poincaré disk), the exponential increase in distance towards the edge means that the same distance margin can be achieved many times within the same space as it becomes "narrower' towards the edge of the hyperbolic space, significantly increasing the possible options to achieve sufficient margin and reduce the loss from a negative item. FIG. 6B shows an example chart 630 of hyperbolic space relative to Euclidian space with respect to the number of points that may be accommodated with sufficient margin given the same spatial radius. In particular, FIG. 6B shows the number of points that can be placed with a radius r from the user while maintaining a distance of 0.1 between the points.

As such, training the embeddings in a hyperbolic space permits additional "room" for positioning such items, as the distance between points in the hyperbolic space increases as points approach the edge of the hyperbolic space and the growth of the space exponentially expands with the radius. This provides additional effective "room" for positioning the embeddings to successfully represent the positive and negative items. Meanwhile, the use of neighbor-based aggregation (achieved through the tangent space projection) further enables the embeddings to successfully incorporate hierarchical and popularity-based information.

Finally, using the margin-based loss, the loss is propagated to modify the local hyperbolic embeddings for items and users by backpropagating the error, which may include a Riemannian stochastic gradient descent in applying the error to an update step of the embeddings. As such, the user and item embeddings may be optimized for the local user hyperbolic embeddings $\theta_u$ for each user and the local item hyperbolic embedding $\theta_i$ for each user.

In one embodiment, the error is applied for a user embedding in an update period t based on the following steps. Similar steps may be performed to update the local item embedding $\theta_i$. First, the gradient of the loss $\nabla L$ in Euclidian space may be determined: $\nabla L=\partial L/\partial \theta_u$, $\nabla L \in \mathbb{R}^{d+1}$. To determine this loss, the partial derivative with respect to the neighbor-aware embedding is determined, and may be backpropagated with the chain rule through the neighbor aggregation.

Next, a Riemannian gradient $\nabla^{H^d}L$ may be calculated by first computing $h^{(t)} = g_{\mathcal{L}}^{-1}\nabla L$ and then projecting $h^{(t)}$ onto the initial tangent representation $\mathcal{T}_{\theta_u^{(t)}}\mathcal{H}^n$:

$$\nabla^{H^d}L = h^{(t)} + \frac{\langle \theta_u^{(t)}, h^{(t)}\rangle_{\mathcal{L}}}{k}\theta_u^{(t)}$$

In which $\nabla^{H^d}L$ is a vector on the tangent space $\mathcal{H}^d$ that gives the direction of steepest descent (to modify the local hyperbolic embedding and reduce the loss function). As such, the local user hyperbolic embedding in the subsequent time period (t+1) is updated in step size η (the learning rate) according to:

$$\theta_u^{(t+1)}=\exp_{\theta_u^{(t)}}(-\eta\nabla^{H^d}L)$$

Similar updates may also be performed for each item embedding. Additional training iterations may be performed, continuing for a number of iterations or until a stop condition has been reached, e.g., that the reduction in the loss function across iterations is below a threshold or has reached a local minima.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system for scoring an item for recommendation to a user, comprising:
    a processor that executes instructions;
    a non-transitory computer-readable medium having instructions executable by the processor for:
        determining a neighbor-aware user embedding representing the user in a multi-dimensional hyperbolic space by combining a plurality of intermediate tangent representations of the user embedding output from a respective plurality of sequential neighbor graph convolutions to a neighbor-aware tangent representation for the user and transforming the neighbor-aware tangent representation for the user to the multi-dimensional hyperbolic space;
        determining a neighbor-aware item embedding representing the item in the multi-dimensional hyperbolic space by combining a plurality of intermediate tangent representations of the item embedding output from a respective plurality of sequential neighbor graph convolutions to a neighbor-aware tangent representation for the item and transforming the neighbor-aware tangent representation for the user to the multi-dimensional hyperbolic space; and
        determining a recommendation score of the item for the user based on a distance in the multi-dimensional hyperbolic space between the neighbor-aware user embedding and the neighbor-aware item embedding.

2. The system of claim 1, wherein the instructions are further executable for selecting the item for recommendation to the user based on the recommendation score.

3. The system of claim 1, wherein the plurality of sequential graph convolutions include an initial graph convolution receiving a local tangent representation of the user or the item as an input.

4. The system of claim 3, wherein the instructions are further executable for initializing the local tangent representation based on a sampling from a probability distribution.

5. The system of claim 1, wherein the instructions are further executable for training the neighbor-aware item embedding and neighbor-aware user embedding with a margin-based training loss propagated through the plurality of sequential neighbor graph convolutions.

6. A method for scoring an item for recommendation to a user, comprising:
    determining a neighbor-aware user embedding representing the user in a multi-dimensional hyperbolic space by combining a plurality of intermediate tangent representations of the user embedding output from a respective plurality of sequential neighbor graph convolutions to a neighbor-aware tangent representation for the user and transforming the neighbor-aware tangent representation for the user to the multi-dimensional hyperbolic space;
    determining a neighbor-aware item embedding representing the item in the multi-dimensional hyperbolic space by combining a plurality of intermediate tangent representations of the item embedding output from a respective plurality of sequential neighbor graph convolutions to a neighbor-aware tangent representation for the item and transforming the neighbor-aware tangent representation for the user to the multi-dimensional hyperbolic space; and
    determining a recommendation score of the item for the user based on a distance in the multi-dimensional hyperbolic space between the neighbor-aware user embedding and the neighbor-aware item embedding.

7. The method of claim 6, further comprising selecting the item for recommendation to the user based on the recommendation score.

8. The method of claim 6, wherein the plurality of sequential graph convolutions include an initial graph convolution receiving a local tangent representation of the user or the item as an input.

9. The method of claim 8, further comprising initializing the local tangent representation based on a sampling from a probability distribution.

10. The method of claim 6, further comprising training the neighbor-aware item embedding and neighbor-aware user embedding with a margin-based training loss propagated through the plurality of sequential neighbor graph convolutions.

11. A non-transitory computer-readable medium for scoring an item for recommendation to a user, the non-transitory computer-readable medium comprising instructions executable by a processor for:
    determining a neighbor-aware user embedding representing the user in a multi-dimensional hyperbolic space by combining a plurality of intermediate tangent representations of the user embedding output from a respective plurality of sequential neighbor graph convolutions to a neighbor-aware tangent representation for the user and transforming the neighbor-aware tangent representation for the user to the multi-dimensional hyperbolic space;
    determining a neighbor-aware item embedding representing the item in the multi-dimensional hyperbolic space by combining a plurality of intermediate tangent representations of the item embedding output from a respective plurality of sequential neighbor graph convolutions to a neighbor-aware tangent representation for the item and transforming the neighbor-aware tangent representation for the user to the multi-dimensional hyperbolic space; and
    determining a recommendation score of the item for the user based on a distance in the multi-dimensional hyperbolic space between the neighbor-aware user embedding and the neighbor-aware item embedding.

12. The non-transitory computer-readable medium of claim 11, wherein the instructions are further executable for selecting the item for recommendation to the user based on the recommendation score.

13. The non-transitory computer-readable medium of claim 11, wherein the plurality of sequential graph convolutions include an initial graph convolution receiving a local tangent representation of the user or the item as an input.

14. The non-transitory computer-readable medium of claim 13, wherein the instructions are further executable for initializing the local tangent representation based on a sampling from a probability distribution.

15. The non-transitory computer-readable medium of claim 11, wherein the instructions are further executable for training the neighbor-aware item embedding and neighbor-aware user embedding with a margin-based training loss propagated through the plurality of sequential neighbor graph convolutions.

* * * * *